(12) United States Patent
Furukawa

(10) Patent No.: US 6,170,598 B1
(45) Date of Patent: Jan. 9, 2001

(54) SUPPORT STRUCTURE OF OPERATOR CONTROL PANEL IN ELECTRICALLY-DRIVEN WHEELCHAIR

(75) Inventor: Hisashi Furukawa, Gifu-ken (JP)

(73) Assignee: Nissin Medical Industries, Co., Ltd., Aichi-ken (JP)

( * ) Notice: Under 35 U.S.C. 154(b), the term of this patent shall be extended for 0 days.

(21) Appl. No.: 09/237,372

(22) Filed: Jan. 26, 1999

(30) Foreign Application Priority Data

Sep. 11, 1998 (JP) .................................................. 10-258998

(51) Int. Cl.[7] .............................. B62D 1/16; B60K 26/00; F16C 11/00; F16D 1/12; F16D 3/00
(52) U.S. Cl. ........................ 180/334; 180/65.1; 180/333; 180/304.1; 248/284.1; 248/289.11; 248/276.1; 248/278.1; 403/112; 403/113; 403/116
(58) Field of Search .................................. 180/65.8, 65.5, 180/65.1, 65.6, 97, 333, 334; 74/471 XY; 248/278.1, 276.1, 230.3, 292.12, 284.1, 289.11; 403/116, 112, 113; 280/250.1, 304.1

(56) References Cited

U.S. PATENT DOCUMENTS

| | | | | |
|---|---|---|---|---|
| 4,491,435 | * | 1/1985 | Meier | 403/55 |
| 4,606,522 | * | 8/1986 | Heifetz | 248/276 |
| 4,809,804 | * | 3/1989 | Houston et al. | 180/65.5 |
| 5,326,063 | * | 7/1994 | Stevens | 248/282 |
| 5,624,198 | * | 4/1997 | Fuchs | 403/76 |
| 5,630,566 | * | 5/1997 | Case | 248/122.1 |
| 5,664,750 | * | 9/1997 | Cohen | 248/231.71 |
| 5,791,609 | * | 8/1998 | Hankins | 248/124.1 |
| 5,816,731 | * | 10/1998 | Howard | 403/120 |
| 5,816,926 | * | 10/1998 | Lynch et al. | 464/114 |
| 5,845,885 | * | 12/1998 | Carnevali | 248/118.1 |
| 5,876,005 | * | 3/1999 | Vasconi | 248/276.1 |
| 5,964,439 | * | 10/1999 | Johnson | 248/278.1 |
| 5,964,473 | * | 10/1999 | Degonda et al. | 280/250.1 |
| 5,992,809 | * | 11/1999 | Sweere et al. | 248/278.1 |

* cited by examiner

Primary Examiner—Paul N. Dickson
Assistant Examiner—Joselynn Z Sliteris
(74) Attorney, Agent, or Firm—Arent Fox Kintner Plotkin & Kahn, PLLC

(57) ABSTRACT

An electrically-driven wheelchair is provided with a frame, drive wheels, an operator control panel and a support lever. The operator control panel controls action of the drive wheels. The lower side of the operator control panel is supported to the upper side of the support lever. The support lever is connected to the frame, and supports the operator control panel. The lower side of the support lever is connected to the frame so that the support lever can be rotated in the longitudinal direction and the lateral direction and can be adjustable. The upper side of the support lever is connected to the operator control panel so that the operator control panel can be rocked forward and rearward and leftward and rightward and can be movable. In the support structure of the operator control panel of the invention, not only the arrangement position of the operator control panel at the front and rear sides and the left and right sides but also the height of the operator control panel can be adjusted.

4 Claims, 7 Drawing Sheets

SUPPORT STRUCTURE OF OPERATOR CONTROL PANEL IN ELECTRICALLY-DRIVEN WHEELCHAIR

BACKGROUND OF THE INVENTION (1) Field of the Invention

The present invention relates to support structure of an operator control panel in an electrically-driven wheelchair. The operator control panel controls action of drive wheels in the electrically-driven wheelchair.

(2) Description of Related Art

In the prior art, an electrically-driven wheelchair is provided with an operator control panel controlling action of drive wheels. The operator control panel is usually arranged in the vicinity of an elbow pad. Because in this constitution, the user can easily operate the operator control panel. The operator control panel is arranged so that its position can be adjusted in the longitudinal direction corresponding to physique, taste or the like of the user. Or the operator control panel is arranged so that its height can be adjusted corresponding to physique, taste or the like of the user.

However, the operator control panel in the prior art is not arranged so that its position can be adjusted in the lateral direction of the wheelchair.

SUMMARY OF THE INVENTION

An object of the present invention is to solve the above-mentioned problems in the prior art. That is, an object of the present invention is to provide support structure of an operator control panel in an electrically-driven wheelchair where the arrangement position of the control panel at the front and rear sides and the left and right sides can be adjusted.

When the arrangement position of the operator control panel is adjusted at the front and rear sides and the left and right sides, the attitude of the operator control panel is preferably maintained to that before the adjustment. Because, following case may occur. For example, when the operator control panel is made a joy stick device, the joy stick device has a control stick projected in the vertical direction. In the joy stick device, it is preferable that even if the arrangement position of the joy stick device is changed at the front and rear sides and the left and right sides, the control stick is arranged in the vertical direction.

An object of the present invention is to solve the above-mentioned problems. That is, an object of the present invention is to provide support structure of an operator control panel in an electrically-driven wheelchair where not only the arrangement position of the operator control panel at the front and rear sides and the left and right sides can be adjusted but also the attitude of the operator control panel can be adjusted.

The foregoing objects are achieved by support structure of an operator control panel in an electrically-driven wheelchair in following constitution. The electrically-driven wheelchair is provided with a frame, drive wheels, an operator control panel and a support lever. The operator control panel controls action of the drive wheels, and the lower side of the operator control panel is connected to the upper side of the support lever. The lower side of the support lever is connected to the frame in the state that the support lever is rotatable in the longitudinal direction and in the lateral direction and is positionable. Also the upper side of the support lever is connected to the operator control panel in the state that the operator control panel is rockable forward and rearward and leftward and rightward and is positionable.

In the support structure according to the present invention, the lower side of the support lever is connected to the frame in the state that the support lever is rotated in the longitudinal direction and the lateral direction and is positionable. Therefore the support lever can be slanted to the frame in the longitudinal direction and the lateral direction with respect to the lower side of the support lever as the rotation center. As a result, the operator control panel supported on the upper side of the support lever can be adjusted to the arrangement position at the front and rear sides and the left and right sides.

Also the upper side of the support lever is connected to the operator control panel in the state that the operator control panel is rocked forward and rearward and leftward and rightward and can be positioned. Therefore if the upper side of the support lever is rocked and positioned, the attitude of the operator control panel can be adjusted. That is, even if the support lever is slanted in the prescribed direction at the front and rear sides and the left and right sides, the attitude of the operator control panel can be adjusted arbitrarily.

Therefore, in the support structure of operator control panel in electrically-driven wheelchair in the present invention, the arrangement position of the operator control panel at the front and rear sides and the left and right sides and the attitude of the operator control panel can be adjusted appropriately.

In the present invention, following constitution may be done. That is, the support lever is provided with a main body, a coupling member and a support member. The main body is arranged substantially in the vertical direction. Also the main body is provided with a spherical part at the upper side. The coupling member is connected to the lower side of the main body, and also connected to a lateral lever extending in the longitudinal direction of the frame. Also the coupling member is provided with a coupling sleeve and a coupling bracket. The coupling sleeve is externally fitted to the lateral lever in the rotatable state in the circumferential direction of the lateral lever. The coupling sleeve is reduced in the inner diameter and is fixed to the lateral lever by the operation of the first screw means. The coupling bracket fixes the main body, and is held to the coupling sleeve in the rotatable state in the longitudinal direction. The coupling bracket is fixed to the coupling sleeve by the operation of the second screw means. The support member is connected to the upper side of the main body, and also connected to the lower side of the operator control panel. Also the support member is provided with an upper support board and a lower support board. The upper support board is fixed to the lower side of the operator control panel. Also the upper support board is provided at the lower surface with a recess where the upper surface side of the spherical part of the main body of the support lever is slidable. The lower support board is fixed to the upper support board by the third screw means. Also the lower support board is provided at the upper surface with a recess where the lower surface side of the spherical part of the main body of the support lever is slidable. When the lower support board is fixed to the upper support board, the spherical part is grasped by the recesses in the upper and lower support boards.

In such support structure, first, the first screw means of the coupling member is loosened, and the coupling sleeve is rotated in the circumferential direction of the lateral lever. Subsequently if the first screw means is tightened, the coupling sleeve can be fixed to the lateral lever. As a result, the arrangement position in the lateral direction of the operator control panel connected to the upper side of the support lever can be adjusted.

Also, first, the second screw means of the coupling member is loosened, and the coupling bracket is rotated in the longitudinal direction with respect to the coupling sleeve. Subsequently if the second screw means is tightened, the bracket can be fixed to the coupling sleeve. As a result, the arrangement position in the longitudinal direction of the operator control panel connected to the upper side of the support lever can be adjusted.

Further, first, the third screw means fixing the lower support board of the support member to the upper support board is loosened, and the upper and lower support boards are rocked forward and rearward and leftward and rightward in the prescribed direction with respect to the spherical part as the center in the main body of the support lever. Subsequently the third screw means fixing the lower support board is tightened, and the spherical part is grasped by the recesses of the upper and lower support boards. Then the upper and lower support boards are fixed to the main body of the support lever. As a result, the attitude of the operator control panel is held at the prescribed angle.

Consequently in such support structure, by the operation of the three sorts of screw means, the arrangement position of the operator control panel in the longitudinal direction and the lateral direction and the attitude of the operator control panel can be adjusted simply.

Further in such support structure, it is preferable that screws are used commonly in the first screw means fixing the coupling sleeve to the lateral lever and in the second screw means fixing the coupling bracket to the coupling sleeve. Because the number of the parts can be reduced.

Moreover it is preferable that length in the axial direction of the main body of the support lever can be adjusted.

Because if the arrangement position of the operator control panel is adjusted in the longitudinal direction and the lateral direction with respect to the lower side of the support lever as the rotation center, the height position of the operator control panel is changed. In this case, if the length of the main body of the support lever is adjusted, the height position of the operator control panel can be adjusted. As a result, corresponding to physique or taste, the operator control panel can be used more conveniently.

DESCRIPTION OF THE PREFERRED EMBODIMENTS

The present invention will be described by way of embodiments shown in the accompanying drawings as follows. The present invention is not limited to the embodiments. All modifications within the requirements of claims or equivalents relating to the requirements shall be included in the scope of the claims.

Figure 1:
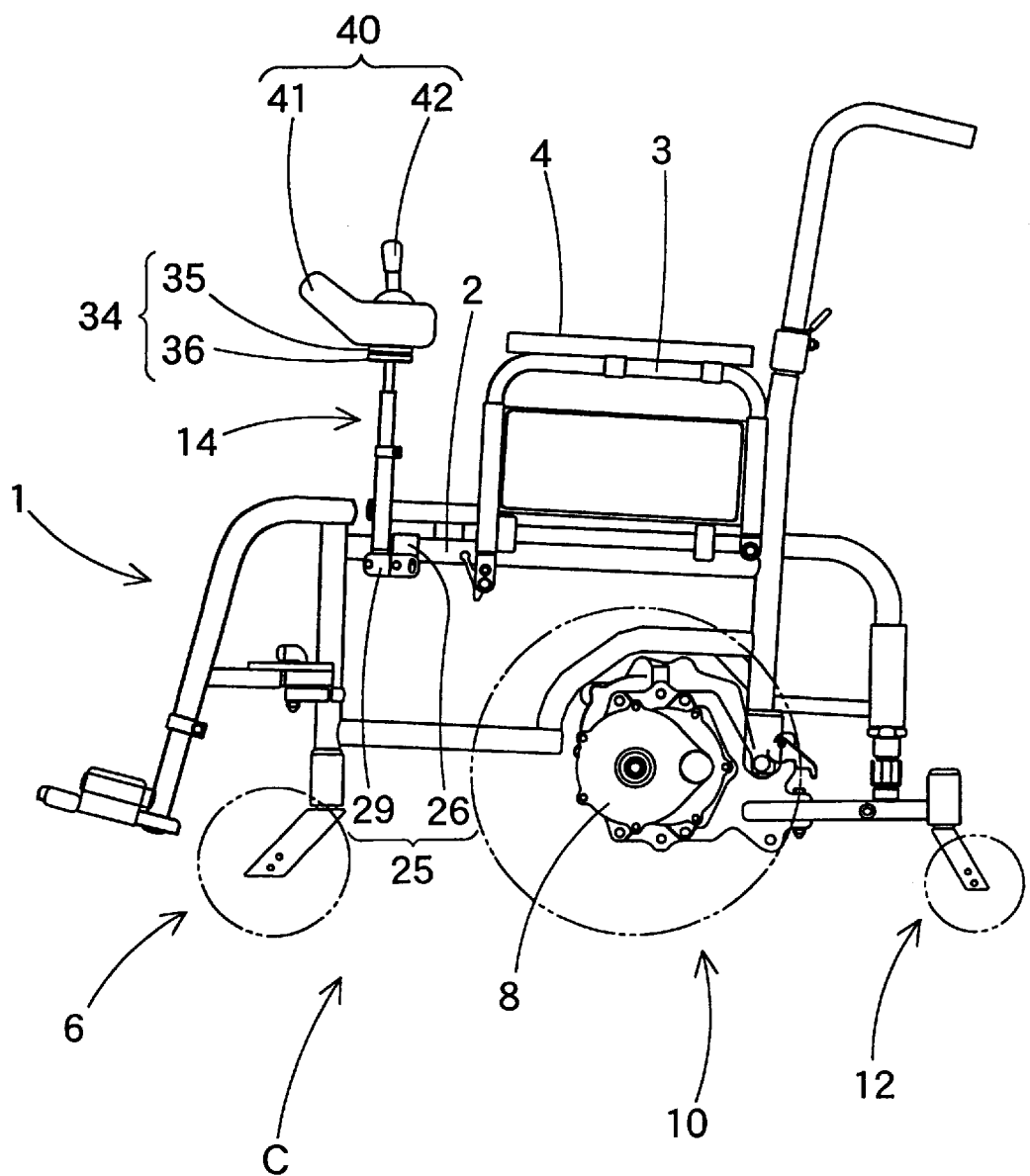
FIG. 1 is a schematic side view showing an electrically-driven wheelchair in an embodiment of the invention.

In the electrically-driven wheelchair C of an embodiment as shown in FIG. 1, a rear wheel 10 at the rear side is a drive wheel which is driven by an electric motor unit 8. The electric motor unit 8 is provided with an electric motor and a battery. A member designated by reference numeral 6 in FIG. 1 is a front wheel constituted by a caster wheel. Also a member designated by reference numeral 12 is an auxiliary wheel constituted by a caster wheel.

Action of the electric motor unit 8 is controlled by an operator control panel 40. The operator control panel 40 is supported by a support lever 14. The operator control panel 40 in the embodiment is made a joy stick device 40. The joy stick device 40 is provided with a main body 41 and a control stick 42. The control stick 42 is projected from the main body 41 upward in the vertical direction.

The support lever 14 is connected to a lateral lever 2 of a frame 1. The lateral lever 2 extends in the longitudinal direction at the left side of the frame 1. In the electrically-driven wheelchair C except for the support lever 14 and the joy stick device 40, members in the frame 1 such as the lateral levers 2, the front wheels 6, the rear wheels 10 and the auxiliary wheels 12 are provided in pairs and arranged in the left and right sides respectively.

Figure 2:
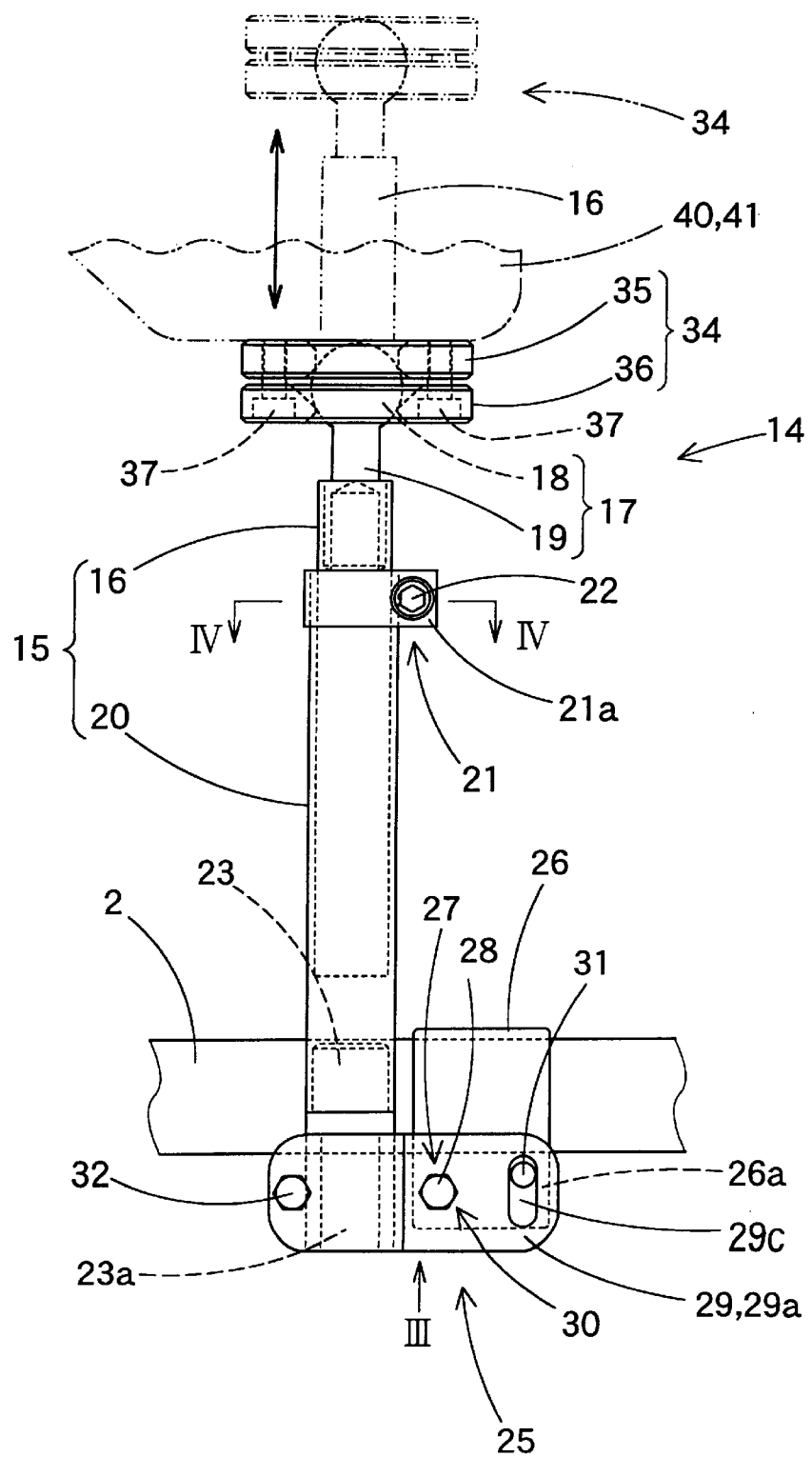
FIG. 2 is an enlarged side view in the vicinity of a support lever in the embodiment.

The support lever 14, as shown in FIG. 2, comprises a main body 15, a coupling member 25 and a support member 34. The main body 15 is arranged substantially in the vertical direction. The coupling member 25 is connected to the lower side of the main body 15 and the lateral lever 2. The support member 34 is connected to the upper side of the main body 15 and the lower side of the joy stick device 40.

The main body 15 is provided with a cylindrical upper pipe 16 and a cylindrical lower pipe 20. An upper block 17 is fixed to the upper side of the upper pipe 16. A lower block 23 is fixed to the lower side of the lower pipe 20. Each of the members 17, 16, 23, 20 is made of aluminum alloy of light weight.

The upper block 17 is provided with a spherical part 18 and a neck part 19. The spherical part 18 is made spherical shape and is arranged at the upper side of the upper block 17. The neck part 19 is made column shape and extends downward from the spherical part 18. The neck part 19 is made the column shape having outer diameter dimension smaller than that of the spherical part 18. The lower side of the neck part 19 is fixed and connected to the upper pipe 16.

Figure 4:
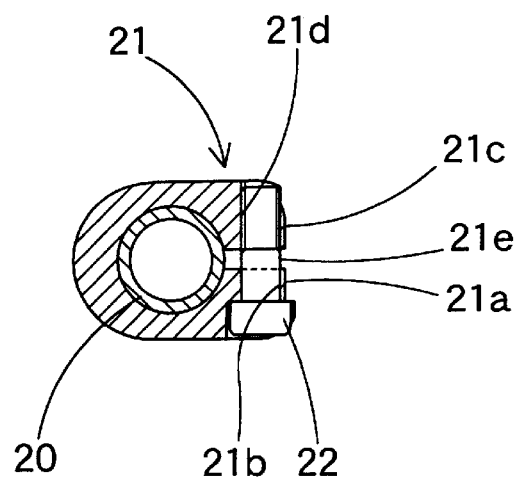
FIG. 4 is a sectional view showing a clamp part of the main body of the support lever in the embodiment at IV—IV position in FIG. 2.

The upper pipe 16 is inserted in slidable state into the lower pipe 20. The lower pipe 20 has such outer diameter dimension that the upper pipe 16 can be slid thereto. The lower pipe 20 has a clamp part 21 at the upper side. The clamp part 21 grasps and fixes the upper pipe 16. The clamp part 21, as shown in FIG. 4, is provided with a slit 21e along the axial direction of the lower pipe 20. Also the clamp part 21 is provided with two tongue pieces 21a, 21c. The slit 21e is interposed between the tongue pieces 21a, 21c opposed to each other. The tongue piece 21a has an insertion hole 21b into which a screw 22 is inserted. The tongue piece 21c has a threaded hole 21d with which the screw 22 is threadedly engaged.

Figure 3:
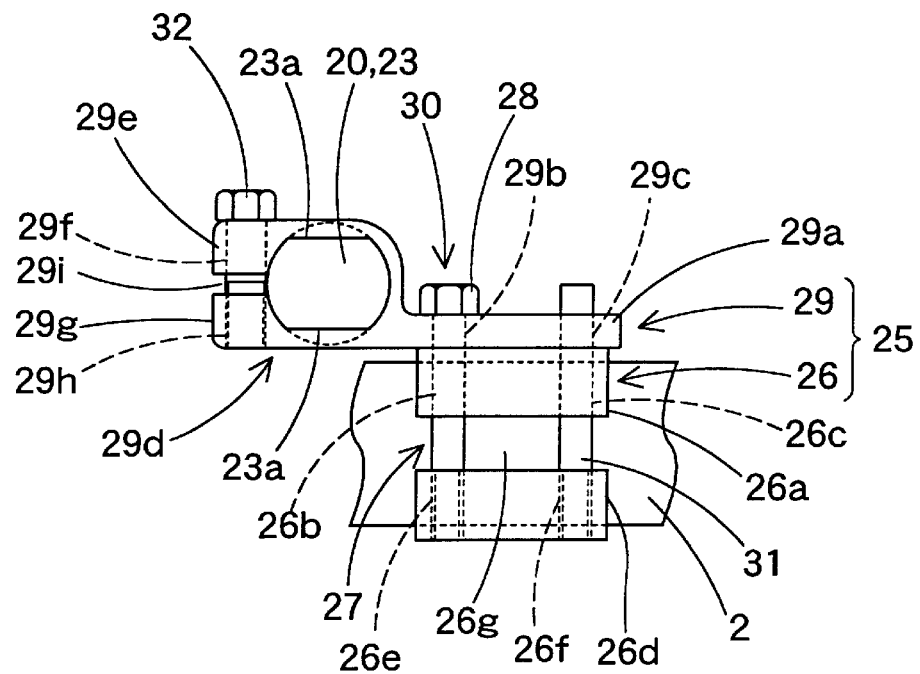
FIG. 3 is a bottom view in the vicinity of the support lever in the embodiment viewing from III direction in FIG. 2.

The lower block 23 is made substantially column shape. The lower block 23 is fixed to the lower pipe 20 in the state that the upper side of the lower block 23 is fitted to the lower side of the lower pipe 20. The lower block 23 has the lower side projected from the lower pipe 20. The lower side of the lower block 23 has two cut-away surfaces 23a as shown in FIGS. 2 and 3. Each cutaway surface 23a is made a flat surface.

The coupling member 25, as shown in FIGS. 2 and 3, is provided with a coupling sleeve 26 and a coupling bracket 29. Each of the coupling sleeve 26 and the coupling bracket 29 is made of aluminum alloy of light weight.

The coupling sleeve 26 is formed substantially in cylindrical shape and is provided with a slit 26g along the axial direction. The coupling sleeve 26 is externally fitted to the lateral lever 2 arranged in the longitudinal direction. The inner diameter of the coupling sleeve 26 has such dimension that it can be rotated in the circumferential direction of the lateral lever 2. Also the coupling sleeve 26 is provided with two tongue pieces 26a, 26d. The tongue pieces 26a, 26d are opposed to each other with respect to the slit 26g interposed. The tongue piece 26a is provided with two insertion holes 26b, 26c. The tongue piece 26d is provided with two threaded holes 26e, 26f. In the coupling sleeve 26, a screw 28 is inserted into the insertion hole 26b and is threadedly engaged with the threaded hole 26e. First screw means 27 is constituted by the screw 28, the insertion hole 26b and the threaded hole 26e. The first screw means 27 has function of fixing the coupling sleeve 26 to the lateral lever 2. That is, in the first screw means 27, the screw 28 is rotated and the inner diameter of the coupling sleeve 26 externally fitted to the lateral lever 2 is reduced. As a result, the coupling sleeve 26 is fixed to the lateral lever 2. Also in the coupling sleeve 26, the stopper pin 31 is inserted into the insertion hole 26c and is threadedly engaged with the threaded hole 26f. The stopper pin 31 has function of defining the rotation region in the longitudinal direction of the coupling bracket 29 to the coupling sleeve 26.

The coupling bracket 29 is provided with a plate part 29a and a clamp part 29d.

The plate part 29a is arranged abutting on the outside surface of the tongue piece 26a of the coupling sleeve 26. The plate part 29a is provided with an insertion hole 29b into which a screw 28 is inserted. Also the plate part 29a is provided with a guide hole 29c into which the stopper pin 31 is inserted. The guide hole 29c has shape extending in the vertical direction. The stopper pin 31 abuts on the inner circumferential surface at the upper side and the lower side of the guide hole 29c when the coupling bracket 29 is rotated about the screw 28 as the rotation center in the longitudinal direction with respect to the coupling sleeve 26. When the stopper pin 31 abuts on the inner circumferential surface at the upper side and the lower side of the guide hole 29c, the rotation range of the coupling bracket 29 is limited. Also second screw means 30 for fixing the coupling bracket 29 to the coupling sleeve 26 is constituted by the insertion hole 29b and the screw 28 to be threadedly engaged with the threaded hole 26e.

The clamp part 29d is arranged deflected outward at the front end side of the plate part 29a. The clamp part 29d fixes the lower block 23 of the main body 15 of the support lever 14. The clamp part 29d is made substantially cylindrically shape and its axial direction is in the vertical direction. The inner circumference of the clamp part 29d is formed so that the portion of the cut-away surface 23a in the lower block 23 can be fitted. Also the clamp part 29d is provided with a slit 29i along the axial direction and two tongue pieces 29e, 29g. The slit 29i is interposed between the two tongue pieces 29e, 29g. The tongue piece 29e is provided with an insertion hole 29f into which a screw 32 is to be inserted. The tongue piece 29g is provided with a threaded hole 29h with which the screw 32 is to be threadedly engaged. The screw 32 is inserted into the insertion hole 29f and is threadedly engaged with the threaded hole 29h and is further tightened. As a result, the clamp part 29d fixes the main body 15 of the support lever 14 and is connected to the main body 15.

Figure 5:
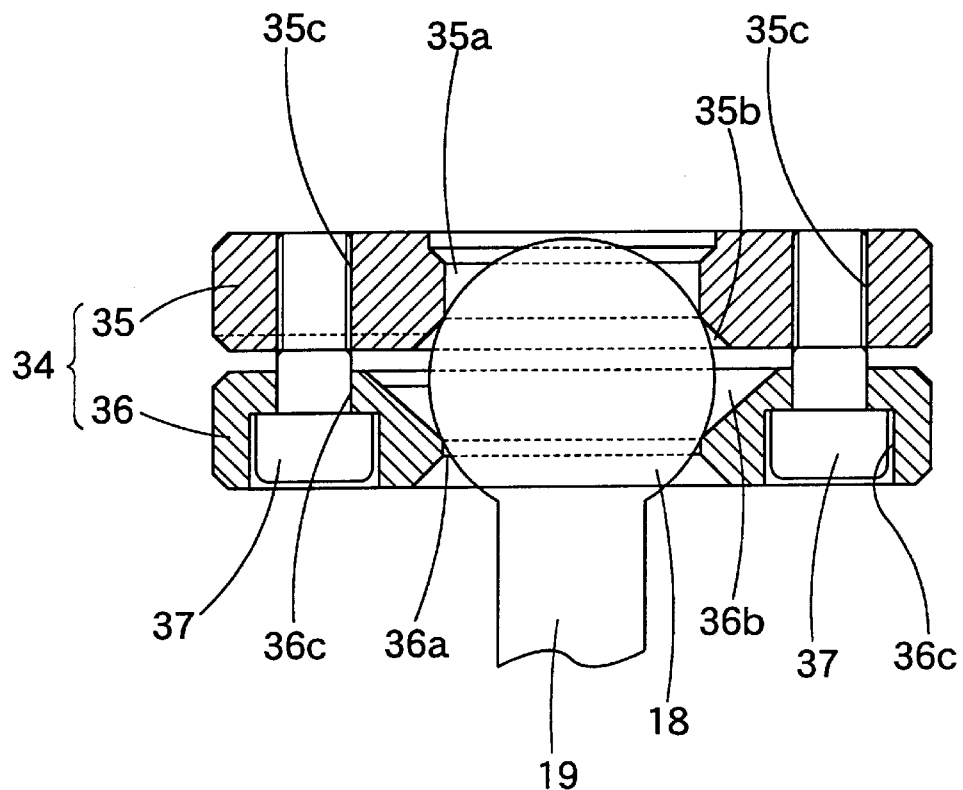
FIG. 5 is an enlarged sectional view showing a support member in the embodiment.

The support member 34, as shown in FIGS. 2 and 5, is provided with an upper support board 35 and a lower support board 36. The upper support board 35 is arranged at the upper side and is fixed to the lower side of the main body 41 in the joy stick device 40. The lower support board 36 is fixed to the upper support board 35 at plural portions by screws 37 as third screw means. These upper and lower support boards 35, 36 are made of aluminum alloy of light weight.

Figure 6:
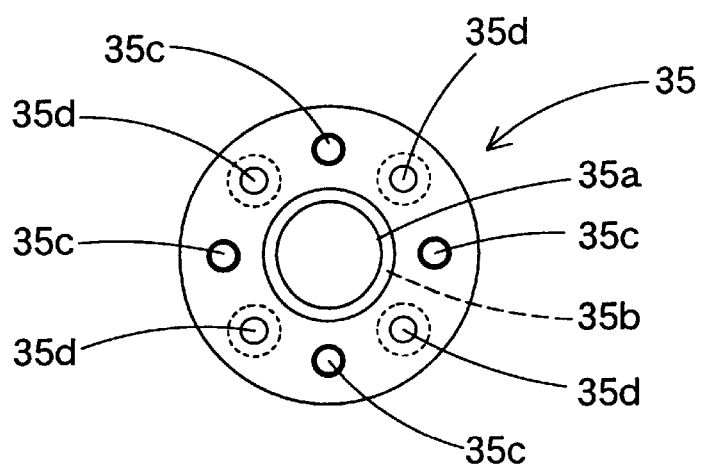
FIG. 6 is a plan view showing an upper support board of the support member in the embodiment.
Figure 7:
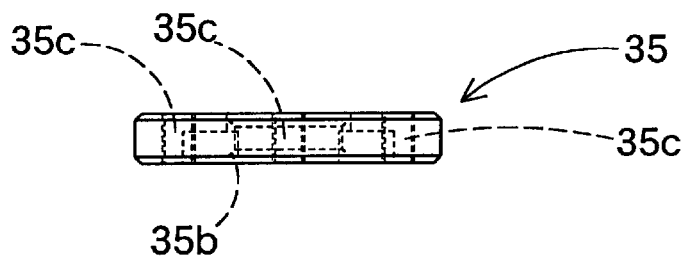
FIG. 7 is a front view showing the upper support board of the support member in the embodiment.

The upper support board 35, as shown in FIGS. 5, 6 and 7, is made annular shape, and a through hole 35a is provided at the center. The upper support board 35 is provided at four portions with threaded holes 35c with which the screws 37 are to be threadedly engaged. The upper support board 35 is provided with a recess 35b in taper shape widened downward on the periphery of the through hole 35a at the lower surface side. The taper surface of the recess 35b is formed so that the upper surface side of the spherical part 18 of the main body 15 of the support lever 14 is slidable. Also the upper support board 35 is provided with four mounting holes 35d. Screws (not shown) for fixing the upper support board 35 to the lower side of the main body 41 are inserted into these mounting holes 35d.

Figure 8:
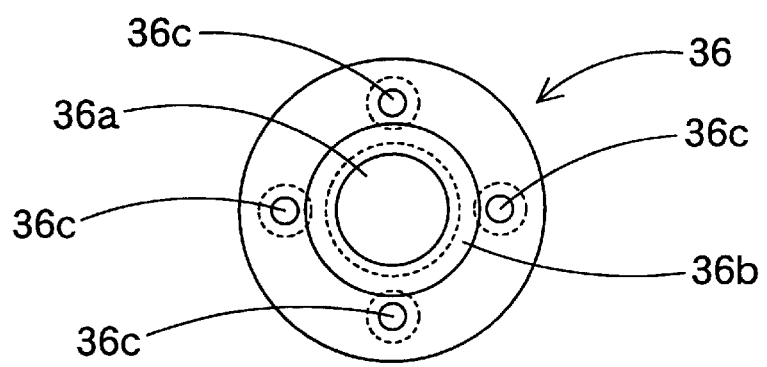
FIG. 8 is a plan view showing a lower support board of the support member in the embodiment.
Figure 9:
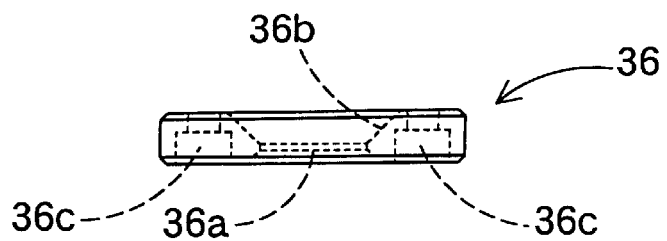
FIG. 9 is a front view showing the lower support board of the support member in the embodiment.

The lower support board 36, as shown in FIGS. 5, 8 and 9, is made annular shape, and a through hole 36a is provided at the center. The neck part 19 of the main body 15 of the support lever 14 is inserted into the through hole 36a. The lower support board 36 is provided at four portions with insertion holes 36c into which the screw 37 are to be inserted. The lower support board 36 is provided with a recess 36b in taper shape widened upward on the periphery of the through hole 36a at the upper surface side. The lower surface side of the spherical part 18 of the support lever 14 is slidable with the taper surface of the recess 36b.

In the support member 34, each screw 37 is inserted into each insertion hole 36c and threadedly engaged with each threaded hole 35c and is tightened. Then the lower support board 36 is fixed to the upper support board 35 fixed to the main body 41 of the joy stick device 40. If each screw 37 is tightened, the spherical part 18 of the main body 15 of the support lever 14 is grasped by the recesses 35b, 36b of the upper and lower support boards 35, 36. As a result, the support member 34 is fixed and connected to the main body 15 of the support lever 14.

Figure 10:
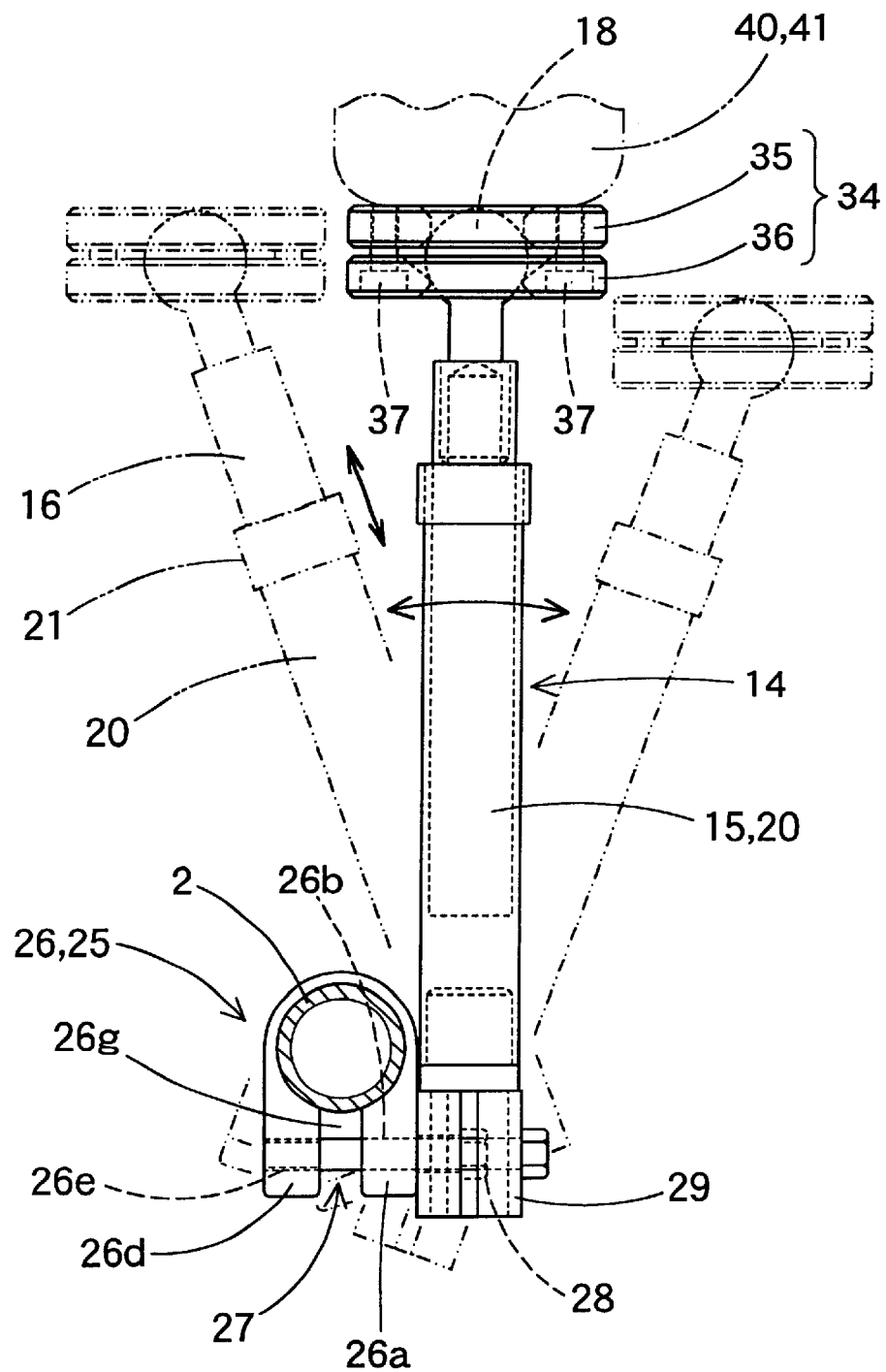
FIG. 10 is a side view of the embodiment showing state that the support lever is rotated and adjusted in the lateral direction.

In the electrically-driven wheelchair C, at the use state, the screw 28 being the first screw means 27 of the coupling member 25 is loosened. As shown in dash-and-dot line in FIG. 10, the coupling sleeve 26 is rotated in the circumferential direction of the lateral lever 2. Subsequently the screw 28 is tightened. Then the arrangement position in the lateral direction of the joy stick device 40 connected to the upper side of the support lever 14 can be adjusted.

Figure 11:
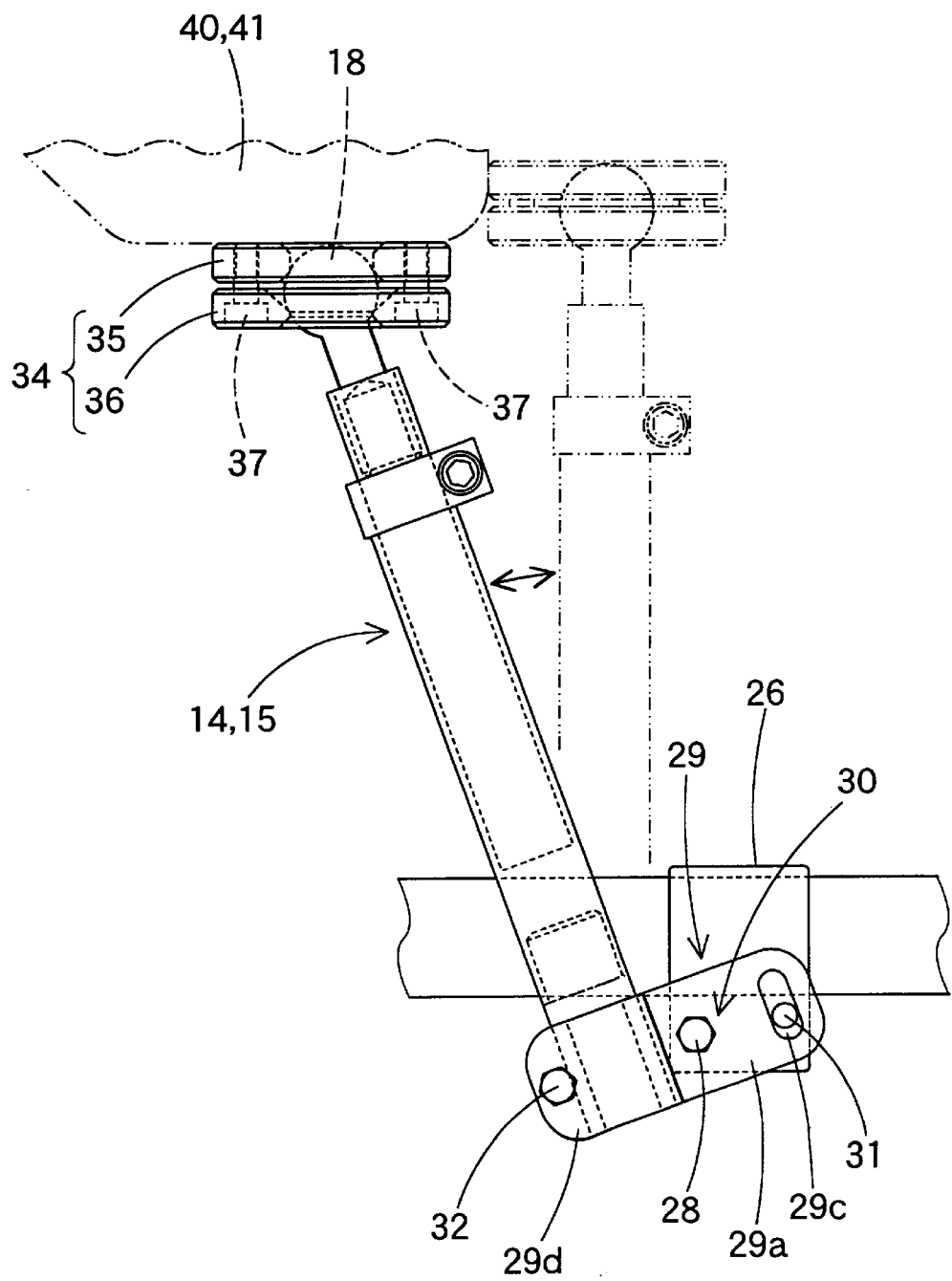
FIG. 11 is a front view of the embodiment showing state that the support lever is rotated and adjusted in the longitudinal direction.

Also the screw 28 as the second screw means 30 of the coupling member 25 is loosened. As shown in solid line in FIG. 11, the coupling bracket 29 is rotated about the screw 28 being the rotation center in the longitudinal direction to the coupling sleeve 26. Subsequently the screw 28 is tightened. Then the arrangement position in the longitudinal direction of the joy stick device 40 connected to the upper side of the support lever 14 can be adjusted.

Further the screw 37 being the third screw means fixing the lower support board 36 of the support member 34 to the upper support board 35 is loosened. The upper and lower support boards 35, 36 are rocked forward and rearward and leftward and rightward in the prescribed direction about the spherical part 18 of the main body 15 of the support lever 14. Subsequently the screw 37 fixing the lower support board 36 is tightened. Then the spherical part 18 is grasped by the recesses 35b, 36b of the upper and lower support boards 35, 36. As a result, the upper and lower support boards 35, 36 are fixed to the main body 15 of the support lever 14. As shown in dash-and-dot line in FIG. 10 and solid line in FIG. 11, the attitude of the joy stick device 40 can be held substantially in the horizontal direction.

Consequently in the support structure of the embodiment, the arrangement position at the front and rear sides and the left and right sides of the joy stick device 40 can be adjusted. Also in the support structure of the embodiment, the attitude of the joy stick device 40 can be adjusted. As a result, in the support structure of the embodiment, the joy stick device 40 can be conveniently utilized corresponding to physique, taste or the like of the user of the electrically-driven wheelchair C.

Particularly in the support structure of the embodiment, by operation of the two sorts of screws 28, 37, the arrangement position at the front and rear sides and the left and right sides of the joy stick device 40 and the attitude of the joy stick device 40 can be adjusted. Therefore in the support structure of the embodiment, the work of the adjustment operation can be performed simply.

In the embodiment, the screw 28 is used commonly by the first screw means 27 and the second screw means 30 in the coupling member 25. Therefore in the support structure of the embodiment, the number of the parts can be reduced. Of course, if this point is not considered, the screw to be used for the screw means 27 and the screw to be used for the screw means 30 may be provided individually.

Further in the embodiment, length in the axial direction of the main body 15 of the support lever 14 can be adjusted. In the adjustment, first, the screw 22 connecting and fixing the upper pipe 16 to the lower pipe 20 is loosened. As shown in dash-and-dot line of FIGS. 2 and 10, the upper pipe 16 is drawn from or housed in the lower pipe 20. Subsequently the screw 22 is tightened. Then the length in the axial direction of the main body 15 of the support lever 14 can be adjusted. In the adjustment, further, the joy stick device 40 can be used conveniently corresponding to the physique or the taste. That is, when the arrangement position of the joy stick device 40 is adjusted at the front and rear sides and the left and right sides with respect to the lower side of the support lever 14 as the rotation center, the height position of the joy stick device 40 is changed. In this case, if the length of the main body 15 of the support lever 14 is adjusted, the height position of the joy stick device 40 can be maintained constant.

In the embodiment, the upper and lower support boards 35, 36 of the support member 34 are made annular shape. Also the upper and lower support boards 35, 36 are provided with the recesses 35b, 36b sliding with the spherical part 18 on the periphery of the through holes 35a, 36a respectively.

However, the upper and lower support boards 35, 36 need not be annular shape. That is, the upper and lower support boards 35, 36 may be slidable with the upper surface side and the lower surface side of the spherical part 18 without interfering with the neck part 19 and may be able to grasp the spherical part 18. Therefore as a modification, the upper and lower support boards 35, 36 may be made U-like plate shape with the lateral side opened.

Also in the embodiment, the screw 37 is inserted into the insertion hole 36c of the lower support board 36 and is threadedly engaged with the threaded hole 35c of the upper support board 35. The screw 37 fixes the lower support board 36 to the upper support board 35. However, if the operation of the fixing screw can be performed without interfering with the operator control panel such as the joy stick device 40, following modification may be done. That is, the upper support board 35 is provided with an insertion hole of a screw fixing the lower support board 36. The position of the insertion hole is that where the interference with the operator control panel such as the joy stick device 40 is eliminated. The lower support board 36 is provided with a threaded hole with which the screw is to be threadedly engaged. In such constitution, the upper and lower support boards 35, 36 may be coupled.

Further in the embodiment, utilizing the screw 28 of the first and second screw means 27, 30, the lower side of the support lever 14 is connected to the lateral lever 2 of the frame 1 so that the support lever 14 is rotated in the longitudinal direction and the lateral direction and can be positioned. Also utilizing the screw 37, the upper side of the support lever 14 is connected to the joy stick device 40 so that the joy stick device 40 is rocked forward and rearward and leftward and rightward and can be positioned. However, the lower side of the support lever 14 may be connected to the lateral lever 2 of the frame 1 so that the support lever 14 is rotated in the longitudinal direction and the lateral direction and can be positioned. Also the upper side of the support lever 14 may be connected to the joy stick device 40 so that the joy stick device 40 is rocked forward and rearward and leftward and rightward and can be positioned. In such constitution, the screw means need not be utilized. As a modification, for example, in each coupling position, spring means may be provided so that biasing force acts in the tightening direction of the screws 28, 37. In this case, large force against the spring means is required. In the modification, however, the rotating and rocking operation of the support lever 14 and the joy stick device 40 can be performed. Further in the modification, the support lever 14 and the joy stick device 40 are positioned at the prescribed position and angle by the biasing force of the spring means.

Also in the embodiment, the case of utilizing the clamp is shown as means for fixing the upper pipe 16 of the main body 15 of the support lever 14 to the lower pipe 20. However, as a modification, following constitution may be done. That is, the modification shows structure that a screw to be pressure-fitted to the outer circumferential surface of the upper pipe 16 is threadedly engaged with the lower pipe 20. In the modification, in the state that the screw is loosened, the upper pipe 16 is drawn from or housed in the lower pipe 20. Subsequently the screw is tightened and the upper pipe 16 is fixed to the lower pipe 20. Then length in the axial direction of the main body 15 of the support lever 14 is adjusted and the upper pipe 16 can be fixed to the lower pipe 20.

Further in the embodiment, the case of connecting the support lever 14 to the lateral lever 2 is shown. An arm pipe 3 with an elbow pad 4 arranged therein is connected to the lateral lever 2. In the embodiment, the joy stick device 40 can be arranged in the vicinity of the elbow pad 4. Therefore in the embodiment, the operator control panel such as the joy stick device 40 can be easily operated. Of course, if the operator control panel can be arranged in the vicinity of the elbow pad 4, the support lever 14 can be connected not only to the lateral lever 2 with the arm pipe 3 connected thereto but also to other position of the frame 1.

What is claimed is:

1. Support structure of an electrically-driven wheelchair having a frame, drive wheel, and an operator control panel, said support structure comprising a support lever having an upper side and a lower side, wherein the upper side telescopes to and away from the lower side and a lower side of the operator control panel is connected to the upper side of the support lever and the lower side of said support lever is connected to said frame so that the support lever can be at least one of rotated in a horizontal direction and a lateral direction and movable in a vertical direction relative to the frame of the electrically-driven wheelchair, and the upper side of the support lever is connected to the operator control panel so that the operator control panel can be manipulated in any one of a forward, a rearward, a leftward, and a rightward position relative to the frame of the electrically-driven wheelchair, wherein said support lever is provided with a main body, a coupling member and a support member, said main body having an upper end and a lower end and is arranged substantially in the vertical direction relative to the frame and is provided with a spherical part at the upper end, said coupling member is connected to the lower end of the main body and is also connected to a lateral lever extending in the longitudinal direction relative to the frame, and is provided with a coupling sleeve and a coupling bracket, said coupling sleeve has an inner diameter dimensioned wherein said coupling sleeve is externally fitted to said lateral lever in rotatable state in a circumferential direction of the lateral lever, and is fixed to the lateral lever by a first screw means, said coupling bracket fixing the main body is held to said coupling sleeve in a rotatable state in the longitudinal direction relative to the frame, and is fixed to the coupling sleeve by a second screw means, said support member is connected to the upper end of the main body and also connected to the lower side of the operator control panel, and is provided with an upper support board and a lower support board, said upper support board is fixed to the lower side of the operator control panel, and is provided at a lower surface with a recess within which an upper surface side of the spherical part of the main body of the support lever is slidable, said lower support board is fixed to the upper support board by a third screw means, and is provided at an upper surface with a recess within which a lower surface side of the spherical part of the main body of the support lever is slidable, and when the lower support board is fixed to the upper support board, the spherical part is grasped by the recesses of the upper and lower support boards.

2. The support structure according to claim 1, wherein the first screw means and the second screw means comprise a common screw for fixing said coupling bracket to said coupling sleeve.

3. The support structure according to claim 1, wherein the main body of said support lever has a length that is adjustable in the vertical direction.

4. The support structure according to claim 1, wherein said operator control panel comprises a control stick device.

* * * * *